Dec. 1, 1942. U. K. PETERSEN Re. 22,228

VENTILATOR ATTACHMENT

Original Filed Aug. 6, 1936 2 Sheets-Sheet 1

INVENTOR
Ulric K. Petersen
BY T. J. Geisler
H. W. Geisler
ATTORNEYS.

Dec. 1, 1942. U. K. PETERSEN Re. 22,228

VENTILATOR ATTACHMENT

Original Filed Aug. 6, 1936 2 Sheets-Sheet 2

INVENTOR
Ulric K. Petersen
BY T. J. Geisler
R. R. Geisler
ATTORNEYS.

Reissued Dec. 1, 1942

Re. 22,228

UNITED STATES PATENT OFFICE 22,228

VENTILATOR ATTACHMENT

Ulric K. Petersen, Sonora, Calif.

Original No. 2,081,640, dated May 25, 1937, Serial No. 94,492, August 6, 1936. Application for reissue February 25, 1942, Serial No. 432,355

15 Claims. (Cl. 126—299)

My invention relates to means connected with the tops of cooking ranges, and the like, for carrying off fumes, smoke and grease, occasioned by the cooking, as well as providing for ventilation over the top of such ranges.

The object of my invention is to improve upon means of this nature heretofore employed, and to overcome the defects and objectionable features which are encountered with the use of presentday devices used for such purposes.

Probably the most common form of ventilating means in present use over cooking ranges is the well-known hood, suspended above the range at considerable height and connected to a flue or other outlet for drawing off the air and the fumes collected within the hoods. This is an inefficient and satisfactory means of meeting the situation. By being placed so high above the range, the hood draws off only a portion of the fumes and heat from the range.

Other types of ventilating devices provide for low hoods over the tops of ranges. These low hoods are better to the extent that they draw off a larger portion of the heat and fumes, but they are still unsatisfactory, especially for large ranges, such as used in restaurants, due to the fact that drafts passing over the top of the range will cause the heat and fumes to be blown out into the room. Such low hoods may interfere with the persons engaged in cooking, making it inconvenient to reach the back of the range, requiring such persons to bend over and reach under the hood and thus offering insufficient protection to such persons from the heat.

In attempts to overcome some of these difficulties various forms of adjustable hoods have been devised. But the general fault with these seems to be that the more efficient such hoods may be in removing fumes and heat, the more they interfere with the free use of the top of the range and the more difficult they are to keep clean.

An object of my invention is to provide ventilating means which will draw off all the smoke and fumes from the top of the cooking range regardless of the size and the length of the range.

A further object of my invention is to provide such a ventilating means which will not be influenced by any side drafts and will work equally well regardless of the location of the range.

A further object is to provide a ventilating means which will offer ample protection from the heat to the face of the person engaged in cooking.

A further object is to provide a ventilating means which will in no wise interfere with the free use of the entire top surface of the cooking range, and will not shut off the light to such surface.

A still further object of my invention is to make suitable provision in the ventilating device for more efficient collection and disposal of a maximum amount of grease from the fumes and smoke drawn from the top of the range.

A final object of my invention is to provide a ventilating means of such construction as will be simple and easily and inexpensively made, and to have the ventilating means set up in such form as to require a minimum of cleaning, but nevertheless to permit cleaning readily and easily.

I attain these objects and incidental results with my invention by dispensing entirely with the usual types of hood and by having my ventilating means including a shelf, located a proper height, preferably above the rear portion of the stove, extending the entire length of the stove and having a width proportional to the depth of the stove, by providing side pieces and intermediate solid vertical brackets or vanes connected with the shelf preventing side currents of air from interfering with the functioning of the ventilating means, by providing a ventilating opening running the entire length of the shelf and stove, by providing a chamber into which the smoke and fumes will be drawn, by providing means for collecting grease, and finally by constructing my ventilating means in a form which will be readily understood from the following description with reference to the attached drawings, in which:

Figure 1:
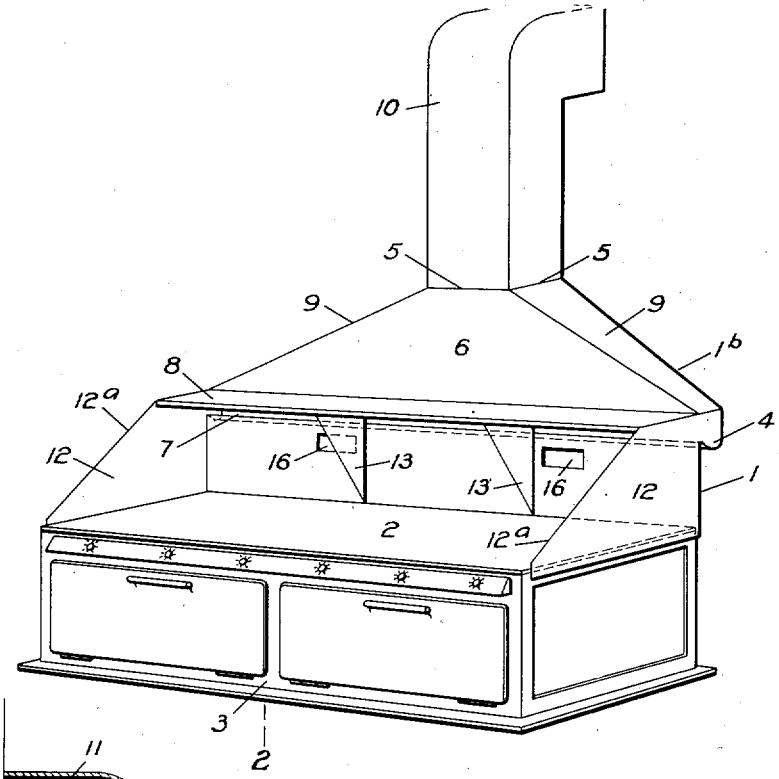
Fig. 1 is a perspective view of a cooking range with a preferred form of my ventilating means attached.
Figure 2:
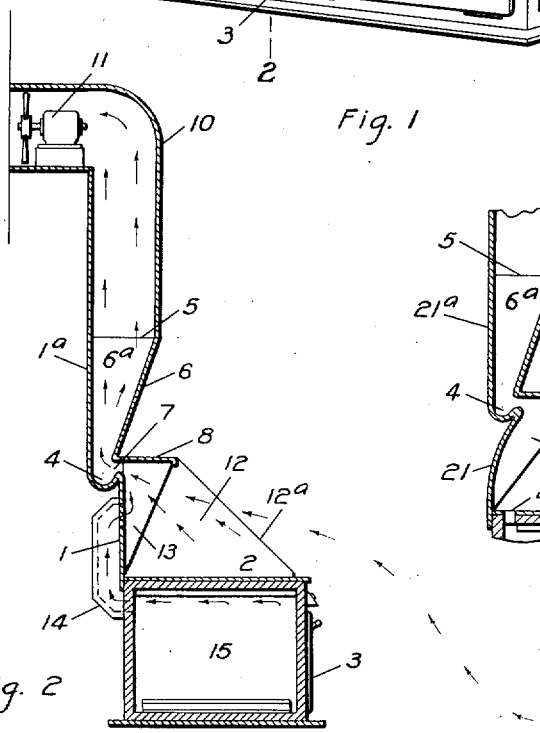
Fig. 2 is a vertical section corresponding to the line 2—2 of Fig. 1, with arrows indicating the passage of currents of air and fumes thru my ventilating means.

Referring first to Figs. 1 and 2, the cooking range, which may be of any ordinary type, is designated by 3, and the range top or cooking surface by 2. A vertical back plate 1, extending the entire length of the range surface 2, is attached to the rear of the range. A horizontal shelf 8, also extending the entire length of the range surface 2, is supported above the rear portion of the range surface 2 by side plates 12 attached to each end of the range. The back plate 1 is formed with a rear offset constituting a longitudinal trough or pocket 4, the front edge of which is located a slight distance below the horizontal shelf 8, and thus forms a slotted opening or passageway 7 beneath the rear edge of the shelf 8. The back plate 1 continues above the rear edge of the trough 4, and forms the back plate extension 1*a* above and to the rear of the shelf 8. The edges 1*b* of the back plate extension 1*a* converge to meet the edges of the rear face of the vent pipe 10.

A front plate 6, corresponding to the back plate extension 1*a*, extends upward from the rear edge of shelf 8, but extends upward obliquely instead of vertically, flaring upwardly and forwardly, and increasing the distance between the front plate 6 and back plate extension 1*a* to enable the front plate 6 to meet the front face of the vent pipe 10 along the bottom edge 5 of the vent pipe. Sloping side pieces 9 complete the inclosure between the front plate 6 and back plate extension 1*a*, and join the lower edges of vent pipe 10 and the rear portion of the upper edges of side plates 12. Thus the bottom of the vent pipe 10 is connected to an inclosed chamber 6*a*, the only entrance to which is thru the slotted opening 7. The rear edges of side plates 12 are made to conform to the shape of the back plate 1, and the end of the trough 4.

A fan 11, installed anywhere within the vent pipe 10, will cause air to be drawn thru the narrow slotted opening 1, and up thru the vent pipe.

The bottoms of the side plates 12 preferably extend across the entire ends of the top surface 2 of the range. The front edges 12*a* of the side plates 12 are preferably sloped to meet the front edge of the shelf 8. At equal intervals between the side plates 12 solid parallel triangular brackets or vanes 13 are secured to the front face of the back plate 1 and the bottom face of the shelf 8. The purpose of these brackets 13 is to divide the currents of air as they are drawn thru the narrow opening 7 beneath the shelf 8, insuring more equal passage of air fumes, etc., thru the opening 7 thruout the entire extension of the opening. The brackets 13 and the broad side plates 12 combine to prevent side drafts and sudden strong currents of air from interfering with the proper functioning of my ventilating means, and prevent any portion of the hot air, smoke and fumes from the top of the range being blown sideways out into the room instead of being drawn into the opening 7. The brackets 13 and side plates 12 thus have an important function in my invention.

The width or depth of the shelf 8 and the height at which it is placed above the top 2 of the range are very important. The shelf 8, if placed too low or made too deep, will interfere with the proper use of the entire top cooking surface 2 of the range, but on the other hand, if placed too high or made too narrow, may permit the escape of some of the heat and fumes into the room unless very strong suction is provided through the vent pipe. The depth of the shelf 8 and its height above the range top 2 should be regulated according to the depth of the range top or distance from front to back of the top cooking surface 2. I have obtained most satisfactory results by making the depth of the shelf 8 from ⅓ to ½ the depth of the range top cooking surface 2, and by placing the shelf 8 a distance above the cooking surface 2 equal approximately to ⅔ of the depth of said cooking surface 2. These proportions may be considerably varied and still enable my device to function properly, but the proportions indicated have been found by me to be most satisfactory in all respects. The width of the slotted opening 7 may be varied, but I have found a 3 inch opening satisfactory for all normal conditions. It is most essential, however, that this opening extend the entire length of the range top.

The arrows in Fig. 2 indicate the courses of air currents drawn thru the narrow opening 7. My ventilating means is designed expressly to subject the top cooking surface 2 to a minimum of cool air drafts. It will be found that while air is drawn from the floor in front of the range 3, this air rises above the top cooking surface 2 in its passage to the opening 7, thus not cooling the top surface 2 but drawing smoke and fumes arising from the cooking with it in its passage under the shelf 8. And the side plates 12 and intermediate brackets 13 protect these currents of air from disturbance by side drafts as previously mentioned.

The trough 4 may be rounded, as shown in the drawings, or may be V-shaped, or made in any other desired form. The purpose of the trough is to catch the grease carried with the smoke and fumes thru the opening 7. From Fig. 2 it can be seen that any grease collecting on the inside of the front plate 6 or back plate extension 1*a*, or on the inside of the lower part of the vent pipe 10, will drop down into trough 4. After making considerable experimental use of my invention with various ranges doing heavy service, I found that with the arrangement of the parts as shown in Figs. 1 and 2, the lower portion of the vent pipe 10 was practically free from grease, even after prolonged use, and furthermore, that comparatively little grease was found on the inside of the front plate 6 or back plate extension 1*a*. Grease accumulated rapidly, however, in the trough 4, but grease is readily removed from this trough and, if desired, the trough 4 may be made with a grease drain at one end.

The arrangement of the chamber 6*a* between the slotted opening 7 and the vent pipe 10 is also important in my invention. The currents of air and fumes after passing thru the opening 7 change their speed and slow down and leave deposits of grease on the inside of chamber 6*a*. As the walls of the condensing chamber 6*a* become heated the deposits of grease thereon all drop into trough 4. There are no other pockets in which grease can collect, and there are no surfaces or corners within the chamber 6*a* which the rising air and fumes do not contact. It is important that the chamber 6*a* be large enough in cross-sectional area, in comparison with the area of the slotted opening 7, to cause an appreciable change in velocity of the air and fumes after they have been drawn through the slotted opening 7 so that they will give off their deposits of grease in said chamber. Thus, in the form in which my ventilator attachment is shown in Figures 1 and 2, assuming a length of 6 feet for the cooking range and a width of 2½ inches for the slotted opening 7, making the total area of the slotted opening 2½×72 or 180 square inches, the cross-sectional area of the condensing chamber 6A should rapidly increase to a point where it is considerably in excess of 180 square inches. If, for example, the dimensions, at the bottom 5 of the vent pipe 10 were 20×20 inches, the cross-sectional area of the condensing chamber would be increased to 400 square inches at the top which would cause considerable slowing down in the air and fumes in the chamber after passing through the slotted opening and would result in a very large proportion of the grease being given and deposited on the condensing chamber walls. Very little grease would then collect in the vent pipe or on the fan 11. I also consider the bending of the air currents as they pass thru the opening 7 and into the bottom of chamber 6a important as aiding in causing such currents to deposit their grease in trough 4 and on the walls of chamber 6a.

In Fig. 2 I show the usual vent pipes 14 connected to the rear of the ovens 15. These vent pipes may be connected to apertures 16 (see Fig. 1) provided in the back plate 1.

Figure 3:
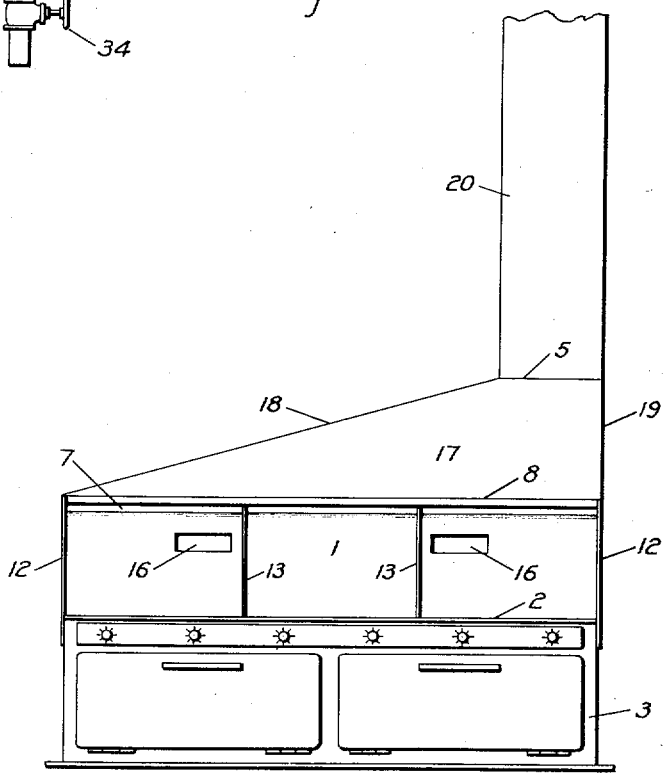
Fig. 3 is a front elevation of the cooking range shown in Fig. 1 but illustrating the adaptation of my invention when the vent pipe is required to be placed at one end of the range instead of above the center of the range.

In Fig. 1 the exhaust or vent pipe 10 is located centrally above the back of the range 3. While this is the usual location for the vent pipe, it is not essential or material in my invention, and the location may be altered to suit convenience. In Fig. 3 the vent pipe 20 is shown located over one end of the range 3. With such arrangement the shape of the front plate 17 is changed accordingly, and is made with one sloping edge 18 and a vertical edge 19. The back plate extension and the joining pieces are changed correspondingly. However, no change is necessary in any of the other portions of the construction. I have found my invention to work equally well when the vent pipe is located above one end of the range, as indicated in Fig. 3.

Figure 4:
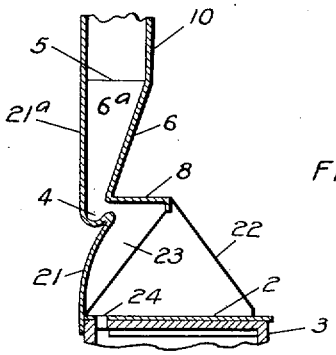
Fig. 4 is a fragmentary vertical section, corresponding to Fig. 2, showing a slight modification in my invention to provide for installations requiring a minimum of space at the back of the range.

In Fig. 4 I show a slight modification in the construction of my ventilating means to accommodate a condition in which the space at the back of the range 3 is required to be reduced to a minimum. In this construction the back plate 21 is curved forward between the rear edge of the top cooking surface 2, and the front edge of the trough 4, enabling the back plate extension 21a, as well as the rear face of vent pipe 10, to be placed in alinement with the rear of the range 3, and thus requiring less space at the rear of the range. The shelf 8 is moved slightly forward, and the shape of the end plates 22, as well as the shape of the brackets 23, is slightly modified. Since there is insufficient room at the rear of the range for the usual oven vent pipe, vent openings 24 thru the top surface 2 of the range at the rear, connect with the ovens and provide the necessary oven ventilation.

Figure 5:
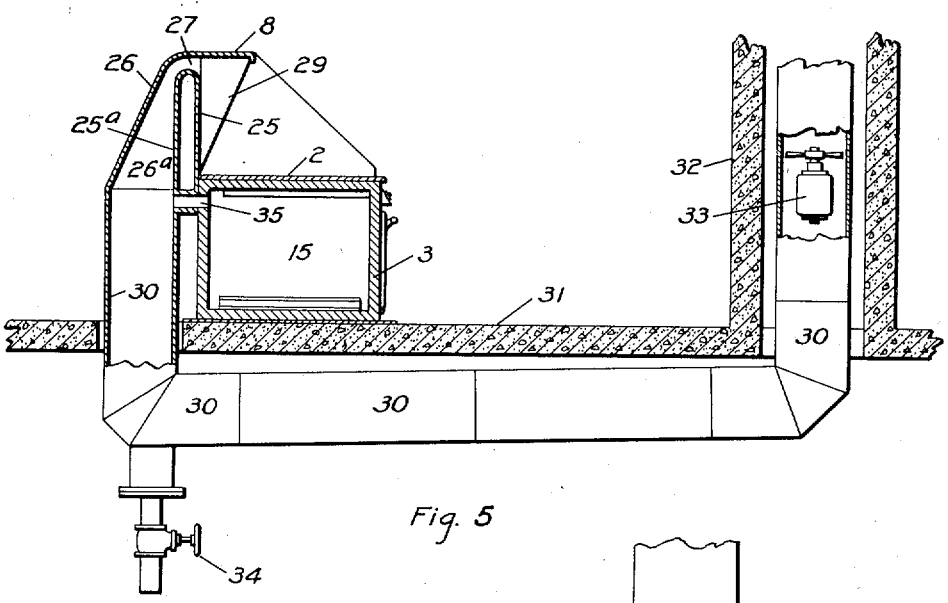
Fig. 5 is a vertical section similar in part to Fig. 2 but illustrating the adaptation of my invention to a downwardly exhausting vent pipe.

Thus far I have shown my invention in combination with an upwardly exhausting vent pipe. In Fig. 5 I illustrate the manner in which my invention may be constructed with a downwardly exhausting vent pipe. In this modified construction the back plate 25 is formed without any trough or upward extension, and is bent downward to form a downward extension 25a, which joins the top of the front face of the vent pipe 30. A second plate 26 shaped like the front plate 6 of Fig. 1 connects the rear edge of the shelf 8 with the top of the rear face of the vent pipe 30. Side pieces complete the inclosure of the space between plate 26 and the downward extension 25a of the plate 25 and the top of the vent pipe 30, forming a chamber 26a, similar to chamber 6a in Figs. 1 and 2, except that it is inverted. The opening 27 beneath the rear of the shelf 8 is the same as the opening 7 in Fig. 1, and extends the entire length of the range 3. The side plates 28 and the parallel triangular brackets 29 are similar to side plates 12 and brackets 13, respectively, of Fig. 1.

The vent pipe 30 extends downward thru the floor 31 and then passes under the floor until it turns upward at any convenient outlet provided in the building, such as 32, leading to the roof or outside of the building. A fan 33 is installed at any convenient place in the vent pipe 30. The portion of the vent pipe lying beneath the floor 31 is sloped slightly from the horizontal, for drainage and cleaning purposes, the lowest point being preferably the point nearest to the range connection, at which lowest point a suitable drain valve 34 is placed. A small vent 35 connects the rear of the oven 15 with the pipe 30 in order to provide suitable ventilation for the oven.

This modified construction with downwardly exhausting vent pipe offers the advantage of permitting the range to be located at any place in the room and provides a light, clear space above the range, which may be desirable under some conditions, and, furthermore, does away entirely with any exposed vent pipes overhead, or above the range. My invention in this modified form functions in exactly the same manner as already described with reference to Figs. 1 and 2.

While the drawings have illustrated my invention in use with an electrical cooking range of modern type, it is to be understood that any other type of range, such as gas, coal or oil, might be substituted. Furthermore, my invention will work equally well with any size range from the small ordinary type to the large oversize ranges installed in large restaurants. All that is required is that the arrangement providing for slotted opening, horizontal shelf, plates or brackets, condensing chamber, and the connections to the vent pipe be carried out substantially as shown, and that a vent pipe of adequate size with means for adequate air suction be provided. Furthermore, my invention is not limited to use with cooking ranges, but may be adapted for other industrial uses, for example, in connection with hand forges, etc.

Without limiting my invention to use with any particular type of range or heat producing medium or appliance, I claim:

1. A ventilator attachment for a range including a horizontal shelf spaced above the rear of the top cooking surface of said range, said shelf extending substantially the entire length of said range, the distance of said shelf above said cooking surface being less than the distance across said cooking surface from front to rear, side plates extending upward from the ends of said cooking surface and supporting said shelf at each end, the lower portion of said side plates extending substantially across said cooking surface from front to rear, a rear plate extending upward from the rear of said cooking surface, a slotted opening between said rear plate and said shelf, said slot extending substantially the entire length of said shelf, a vent pipe, a chamber connecting said slotted opening with said vent pipe, whereby air passing thru said vent pipe will be drawn in thru said slotted opening, bracket-like vanes connecting said shelf and said back plate spaced between said side plates, said vanes serving to divide the currents of air drawn into said slotted opening, said vanes and said side plates acting to prevent side drafts from interfering with the currents of air thru said slotted opening, means for creating air suction thru said vent pipe, whereby currents of air will pass over said cooking surface into said slotted opening carrying with them the fumes and smoke arising from said cooking surface.

2. A ventilator attachment for a range including a horizontal shelf spaced above the rear of the top cooking surface of said range, said shelf extending substantially the entire length of said range, side plates extending upward from the ends of said cooking surface and supporting said shelf at each end, the lower portion of said side plates extending substantially across said cooking surface from front to rear, a rear plate extending upward from the rear of said cooking surface, a slotted opening between said rear plate and said shelf, said slot extending substantially the entire length of said shelf, a vent pipe, a chamber connecting said slotted opening with said vent pipe, whereby air passing thru said vent pipe will be drawn in thru said slotted opening, bracket-like vanes connecting said shelf and said back plate spaced between said side plates, said vanes serving to divide the currents of air drawn into said slotted opening, said vanes and said side plates acting to prevent side drafts from interfering with the currents of air thru said slotted opening, means for creating air suction thru said vent pipe, whereby currents of air will pass over said cooking surface into said slotted opening carrying with them the fumes and smoke arising from said cooking surface, means for collecting grease in said chamber and for removing such collected grease.

3. The combination described by claim 1 with the distance of said shelf above said cooking surface and the depth of said shelf being less than the distance across said cooking surface from front to rear, an upwardly extending vent pipe, a chamber connecting said slotted opening with said vent pipe, whereby air pasing thru said vent pipe will be drawn in thru said slotted opening, and a grease-collecting trough connected to said back plate and located below and to the rear of said slotted opening.

4. The combination described by claim 1 with the distance of said shelf above said cooking surface and the depth of said shelf being less than the distance across said cooking surface from front to rear, a downwardly extending vent pipe, a chamber connecting said slotted opening with said vent pipe, whereby air passing thru said vent pipe will be drawn in thru said slotted opening, and means for collecting grease in said vent pipe and for removing such collected grease.

5. In a ventilator attachment of the character described associated with a top cooking surface of a range, an elongated slot parallel to said surface located above said surface and extending substantially the entire length of said surface, the distance of said slot above said surface being less than the distance across said surface from front to rear, a chamber connected to said slot, a vent pipe connected to said chamber and means for drawing air thru said vent pipe, said chamber and said slot, means for preventing cross currents of air between said surface and said slot, said latter mentioned means including side plates extending upward from the ends of said surface and intermediate vanes parallel to said side plates.

6. A ventilator attachment for a range including a horizontal shelf spaced above the top cooking surface of said range, said shelf extending substantially the entire length of said range, side plates extending upward from the ends of said cooking surface and supporting said shelf at each end, a rear plate extending upward from the rear of said cooking surface, a slotted opening between said rear plate and said shelf, said slot extending substantially the entire length of said shelf, a vent pipe, a chamber connecting said slotted opening with said vent pipe, whereby air passing thru said vent pipe will be drawn in thru said slotted opening, bracket-like vanes connecting said shelf and said back plate spaced between said side plates, said vanes serving to divide the currents of air drawn into said slotted opening, said vanes and said side plates acting to prevent side drafts from interfering with the currents of air through said slotted opening, means for creating air suction thru said vent pipe, whereby currents of air will pass over said cooking surface into said slotted opening carrying with them the fumes and smoke arising from said cooking surface.

7. A ventilator attachment for a range including a horizontal shelf spaced above the top cooking surface of said range, said shelf extending substantially the entire length of said range, side plates extending upward from the ends of said cooking surface and supporting said shelf at each end, the lower portion of said side plates extending substantially across said cooking surface from front to rear, a rear plate extending upward from the rear of said cooking surface, a slotted opening between said rear plate and said shelf, said slot extending substantially the entire length of said shelf, a vent pipe, a chamber connecting said slotted opening with said vent pipe, whereby air passing thru said vent pipe will be drawn in thru said slotted opening, bracket-like vanes connecting said shelf and said back plate spaced between said side plates, said vanes serving to divide the currents of air drawn into said slotted opening, said vanes and said side plates acting to prevent side drafts from interfering with the currents of air through said slotted opening, means for creating air suction thru said vent pipe, whereby currents of air will pass over said cooking surface into said slotted opening carrying with them the fumes and smoke arising from said cooking surface.

8. In a ventilator attachment of the character described associated with a top cooking surface of a range, an elongated slot parallel to said surface located above said surface and extending substantially the entire length of said surface, the distance of said slot above said surface being less than the distance across said surface from front to rear, a vent passage having air suction means connected to said slot, side plates extending upward from the ends of said cooking surface, the lower ends of said side plates extending approximately across said cooking surface from front to rear, the upper ends of said side plates extending over the ends of said slot, said vent passage extending upwardly from said slot, and a grease-collecting trough associated with said slot and located below said slot and so arranged as to receive grease from the walls of said passage.

9. In a ventilator attachment of the character described associated with a top cooking surface of the range, an elongated slot parallel to said surface located above said surface and extending substantially the entire length of said surface, the distance of said slot above said surface being less than the distance across said surface from front to rear, a grease-condensing chamber, said slot constituting the inlet for said chamber, air suction means connected with said chamber and slot, side plates extending upward from the ends of said cooking surface, the lower ends of said side plates extending approximately across said cooking surface from front to rear, the upper ends of said side plates extending over the ends of said slot, and a grease-collecting trough associated with said slot and located below said slot and so arranged as to receive grease from the walls of said chamber, the cross-sectional area of said chamber being sufficiently larger than the area of said slot, to cause the velocity of air, smoke and fumes pasing through said slot to be considerably retarded in said chamber, in order that grease particles carried with said air, smoke and fumes through said slot may be given up in said chamber and deposited temporarily on the walls of said chamber.

10. In a ventilator atachment located above the top cooking surface of a range, a shelf parallel to said surface and extending substantially the entire length of said surface, an elongated slot associated with said shelf and extending substantially the entire length of said shelf, end plates connecting the ends of said shelf with the ends of said cooking surface, the upper portions of said plates extending over the ends of said slot, whereby to screen the ends of said slot from side drafts, a grease-condensing chamber, said slot constituting the entrance to said chamber, said chamber being of sufficient size to cause the velocity of currents of air and fumes passing through said slot to be retarded in said chamber, whereby to cause deposits of grease in said chamber, a vent pipe attached to said chamber, and means for creating a suction of air through said vent pipe.

11. In a ventilator attachment located above the top cooking surface of a range, a shelf parallel to said surface and extending substantially the entire length of said surface, an elongated slot associated with said shelf and extending substantially the entire length of said shelf, and bracket-like vanes attached to said shelf, said vanes serving to divide the currents of air passing through said slot and to screen said slot from side drafts, a grease-condensing chamber, said slot constituting the entrance to said chamber, said chamber being of sufficient size to cause the velocity of currents of air and fumes passing through said slot to be retarded in said chamber, whereby to cause deposits of grease in said chamber, a vent pipe attached to said chamber, and means for creating a suction of air through said vent pipe.

12. In a ventilator attachment located above the top cooking surface of a range, a shelf parallel to said surface and extending substantially the entire length of said surface, an elongated slot associated with said shelf and extending substantially the entire length of said shelf, end plates connecting the ends of said shelf with the ends of said cooking surface, the upper portions of said plates extending over the ends of said slot, whereby to screen the ends of said slot from side drafts, and bracket-like vanes attached to said shelf, said vanes serving to divide the currents of air passing through said slot and to screen said slot from side drafts.

13. In a ventilator attachment located above the top cooking surface of a range, an elongated slot parallel to said surface and extending substantially the entire length of said surface, and vanes extending in front of said slot, said vanes serving to divide the currents of air passing through said slot and to screen said slot from side drafts.

14. In a ventilator attachment located above the top cooking surface of a range, an elongated slot parallel to said surface and extending substantially the entire length of said surface, and vanes extending in front of said slot, said vanes serving to divide the currents of air passing through said slot and to screen said slot from side drafts, a grease-condensing chamber, said slot connected to the entrance to said chamber, said chamber being of sufficient size to cause the velocity of currents of air and fumes passing through said slot to be retarded in said chamber, whereby to cause deposits of grease in said chamber, a vent pipe attached to said chamber, and means for creating a suction of air through said vent pipe.

15. In a ventilator for a cooking range and the like, a grease-condensing chamber, an inlet to said chamber, a slot connected with said inlet and located above the range, a vent pipe connected to said chamber, means for creating a suction of air through said vent pipe, chamber inlet and slot, the cross-sectional area of said chamber being sufficiently larger than the area of said slot to cause the velocity of air, smoke and fumes drawn through said slot and said inlet to be considerably retarded in said chamber, thereby causing the air, smoke and fumes to give up particles of grease carried through said slot and inlet and to deposit such grease particles on the walls of said chamber, and means for collecting grease from the bottom of said chamber.

ULRIC K. PETERSEN.